(12) United States Patent
Tanaka et al.

(10) Patent No.: US 6,921,010 B2
(45) Date of Patent: Jul. 26, 2005

(54) METHOD OF JOINING TOGETHER TWO PLANAR MEMBERS BY FRICTION STIR WELDING, AND TAB PLATE USED IN THE SAME METHOD

(75) Inventors: Sunao Tanaka, Nagoya (JP); Masaki Kumagai, Nagoya (JP)

(73) Assignee: Sumitomo Light Metal Industries, Ltd., Minato-Ku (JP)

( * ) Notice: Subject to any disclaimer, the term of this patent is extended or adjusted under 35 U.S.C. 154(b) by 0 days.

(21) Appl. No.: 10/694,936

(22) Filed: Oct. 27, 2003

(65) Prior Publication Data

US 2004/0084506 A1 May 6, 2004

(30) Foreign Application Priority Data

Nov. 5, 2002 (JP) ........................................ 2002-321295

(51) Int. Cl.[7] .............................................. B23K 20/12
(52) U.S. Cl. ..................................... 228/2.1; 228/112.1
(58) Field of Search ............................... 228/112.1, 2.1, 228/110.1, 114.5, 44.3; 156/73.5

(56) References Cited

U.S. PATENT DOCUMENTS

| 5,460,317 A | 10/1995 | Thomas et al. | |
|---|---|---|---|
| 6,193,137 B1 * | 2/2001 | Ezumi et al. | 228/112.1 |
| 6,299,050 B1 * | 10/2001 | Okamura et al. | 228/110.1 |
| 6,715,664 B2 * | 4/2004 | Yamashita | 228/112.1 |

FOREIGN PATENT DOCUMENTS

| JP | 7-505090 A1 | | 6/1995 |
|---|---|---|---|
| JP | 2000-042759 A1 | | 2/2000 |
| JP | 2000-042762 A1 | | 2/2000 |
| JP | 2003-94174 | * | 4/2003 |
| WO | WO 93/10935 | | 6/1993 |

OTHER PUBLICATIONS

Sunao et al. Translation to JP 2003–094174. 15 pages. Apr. 2, 2003.*

* cited by examiner

Primary Examiner—Jonathan Johnson
(74) Attorney, Agent, or Firm—Burr & Brown

(57) ABSTRACT

Method of joining together two planar members, by a friction stir welding operation wherein a rotary tool having a probe is moved relative to a joint region defined between the mutually butted planar members such that the probe is rotated and inserted in the joint region. The welding operation is performed by using a tab plate having a cutout formed in its end face such that the cutout has a width not smaller than a radius of a peripheral circle to be described by the shoulder surface, and a depth not smaller than a minimum radius of the probe and not larger than the radius of the peripheral circle. The tab plate is positioned such that the end face of the tab plate is in abutting contact with end faces of the planar members corresponding to a terminal portion of the joint region at which the welding operation is to be terminated, and such that a distance between a terminal end of the terminal end portion and one of opposite ends of the cutout width which is located on one side of the joint region which corresponds to an upstream side as seen in a rotating direction of the rotary tool at its leading end is not smaller than zero and not larger than a maximum radius of the probe, while a distance between the terminal end of the joint region and the other end of the cutout width is not smaller than the radius of the peripheral circle. The welding operation is terminated after the rotary tool which has been moved to the terminal end is further moved across the cutout.

16 Claims, 5 Drawing Sheets

US 6,921,010 B2

METHOD OF JOINING TOGETHER TWO PLANAR MEMBERS BY FRICTION STIR WELDING, AND TAB PLATE USED IN THE SAME METHOD

This application is based on Japanese Patent Application No. 2002-321295 filed on Nov. 5, 2002, the contents of which are incorporated hereinto by reference.

BACKGROUND OF THE INVENTION

1. Field of the Invention

The present invention relates in general to a method of joining together two planar members by friction stir welding, and a tab plate used in the method, and more particularly to such a method that permits sound welding at the end portion of a weld region at which the friction stir welding operation is terminated, and a tab plate suitably used in the friction stir welding operation.

2. Discussion of Related Art

Recently, an increasing attention has been drawn to a friction stir welding process, as one of welding processes which are used for joining together two planar members and which involve a relatively small amount of heat generation, a relatively small amount of strength reduction in the weld region and a relatively small amount of residual strain in the weld region. Examples of the friction stir welding process are disclosed in U.S. Pat. No. 5,460,317 and JP-A-7-505090.

Described in detail, the friction stir welding process is performed by using a rotary tool or wheel 3, which has a cylindrical body 6 in the form of a round rod having a circular shoulder surface 5 at its bottom end, and a probe 4 in the form of a pin formed on the shoulder surface 5 such that the probe 4 is coaxial with the shoulder surface 5, as shown in FIG. 1. The probe 4 is formed of a harder material than the materials of two planar members 2a, 2b to be joined together by a friction stir welding operation. In the friction stir welding operation, the rotary tool 3 rotated at a high speed is moved relative to a joint region 8 defined by end portions of the two planar members 2a, 2b which are butted together. The rotary tool 3 is moved relative to the joint region 8 such that the shoulder surface 5 is held in rubbing contact with the surface of the joint region 8 while the probe 4 is held inserted in the joint region 8, so that frictional heat is generated between the rotating probe 4 and shoulder surface 5 and the planar members 2a, 2b, whereby the material at the joint region 8 and in the vicinity of the joint region 8 is plasticised by the generated frictional heat, while the plasticised segments of the butted end portions of the two planar members 2a, 2b are interlocked with each other, as a result of a stirring action of the probe 4 rotating at the high speed. Thus, the two planar members 2a, 2b are jointed together without melting of their materials.

The friction stir welding operation described above is terminated at one of opposite longitudinal end portions of the joint region 8 of the planar members 2b, 2a. Described more precisely, the rotary tool 3 is lifted to remove the probe 4 from the joint region 8, at a position which is spaced by at least 10 mm away from the end faces of the planar members 2a, 2b corresponding to the above-indicated one longitudinal end portion of the joint region 8, in the direction toward the other longitudinal end portion. The friction stir welding operation is terminated at the above-indicated position of the joint region 8, in order to prevent occurrence of a joining or welding defect at the above-indicated one longitudinal end portion of the joint region 8, which would be caused by an escape flow of the material plasticised and stirred by the rotating rotary tool 3, from the corresponding end of the joint region 8. As a result, a weld region 10 formed by the friction stir welding operation performed on the joint region 8 does not reach the end faces of the two planar members 2a, 2b on the side of termination of the friction stir welding operation, so that a non-weld region 12 remains at the above-indicated longitudinal end portion of the joint region 8, as shown in FIG. 1, over a certain length not smaller than 10 mm between the corresponding end of the joint region 8 (end faces of the planar members 2a, 2b) and the periphery of the circular shoulder surface 5 (the corresponding end of the formed weld region 10) upon termination of the friction stir welding operation. Accordingly, it is necessary to rectify an assembly of the two planar members 2a, 2b joined together, by removing the non-weld region 12 or performing a supplemental fusion welding operation at the non-weld region 12. This rectifying operation performed after the friction stir welding operation not only reduces the efficiency of the overall welding operation, but also causes some other drawbacks such as residual strain and softening of the material due to the supplemental fusion welding operation, and formation of a cavity or recess at the end of the weld region 10 due to removal or separation of the probe 4 and shoulder surface 5 of the rotary tool 3 away from the joint region 8.

To solve such drawbacks that would be caused by the termination of the friction stir welding operation, there has been proposed a friction stir welding technique wherein each of the two workpieces to be joined together is provided with a dummy end section corresponding to the end portion of the joint region at which the friction stir welding operation is terminated. After the friction stir welding operation, the dummy end sections of the two workpieces are cut off, so that an obtained assembly of the workpieces joined together does not have a cavity or recess which would be left due to the removal or separation of the probe 4 and shoulder surface 5 of the rotary tool 3. An example of this technique is disclosed in JP-A-2000-42759. However, this technique still has some problems such as a need of forming the workpieces with the dummy end sections, and an inevitably increased cost of manufacture of the desired assembly due to the removal of some amount of material from the workpieces, and an operation to remove the dummy sections.

The friction stir welding process is also performed to join together two tubular members such that an abutment jig is in abutting contact with a joint region of the two tubular members, and such that the friction stir welding operation is terminated by moving the rotary tool from the terminal end of the joint region onto the abutting jig, for thereby preventing undesirable formation of a cavity or recess due to the removal of the rotary tool from the end portion of the joint region. An example of this technique is disclosed in JP-A-2000-42762. However, this technique suffers from a problem of difficulty to remove the abutting jig from the weld region in the presence of a stirred metal material at the interface between the weld region and the abutting jig. An excessively large force if applied to the interface to remove the abutting jig would cause a part of the abutting jig to remain at the interface, resulting in a need of rectifying an obtained assembly of the two tubular members, or giving rise to a risk of occurrence of a joining or welding defect due to a partial removal of the weld region. Thus, this technique is not desirable to assure a sound weld region in the obtained assembly of the tubular members.

SUMMARY OF THE INVENTION

The present invention was made in view of the background art discussed above. It is a first object of the present invention to provide a relatively simple method suitable for joining together two planar members by a friction stir welding operation, which is terminated so as to assure a sound state of welding at the terminal end portion of the joint region. A second object of the invention is to provide a tab plate which can be suitably used in the friction stir welding method of the invention.

The first object indicated above may be achieved according to a first aspect of the present invention, which provides a method of joining together two planar members, by butting together the two planar members so as to form a joint region therebetween, and performing a friction stir welding operation wherein a rotary tool having a shoulder surface at a bottom end thereof and a probe coaxially provided on the shoulder surface is moved relative to the two planar members such that the probe is rotated with the rotary tool and inserted in the joint region, the method comprising the steps of:

preparing a tab plate having a cutout formed in an end face thereof, such that the cutout has a width which is not smaller than a radius of a peripheral circle to be described by a periphery of the shoulder surface of the rotary tool during rotation of the rotary tool, and a depth which is not smaller than a minimum radius of the probe and not larger than the radius of the peripheral circle of the shoulder surface, the width being measured in a direction parallel to the end face and a direction in which the two planar members are butted together, while the depth being measured in a direction perpendicular to the direction of the width;

positioning the tab plate relative to the two planar members such that the end face is held in abutting contact with end faces of the two planar members which correspond to a terminal portion of the joint region at which the friction stir welding operation is to be terminated, and such that one of opposite ends of the width is located on one side of the joining region which corresponds to an upstream side as seen in a rotating direction of the rotary tool, as viewed at a leading end of the rotary tool in its direction of movement, and further such that a distance between a terminal end of the terminal end portion of the joint region and the above-indicated one end of the width is not smaller than zero and not larger than a maximum radius of the probe, while a distance between the above-indicated terminal end and the other of the opposite ends of the width is not smaller than the radius of the peripheral circle; and initiating said friction stir welding operation after the tab plate is positioned relative to the two planar members, and terminating the friction stir welding operation after the rotary tool which has been moved to the terminal end of the joint region is further moved across the cutout to a position within an area of the tab plate.

In the method of joining together the two planar members by the friction stir welding operation according to the present invention, the friction stir welding operation is initiated after the tab plate is positioned relative to the two planar members, such that the end face of the tab plate in which the cutout is formed is held in abutting contact with the end faces of the planar members. The friction stir welding operation is terminated after the rotary tool which has been moved to the terminal end of the joint region is further moved across the cutout to a position within the area of the tab plate. Accordingly, the present method permits formation of a weld region such that the extreme end of the weld region is located within the area of the tab plate, while preventing an escape flow of the plasticised metal material from the terminal end portion of the joint region, during a terminal portion of the friction stir welding operation wherein the metal materials in local portions of the two planar members near the joint region are stirred by stirring actions of the rotary tool under rotation. Thus, the present method eliminates the conventionally experienced drawbacks due to the escape flow of the plasticised metal material, such as occurrence of a joining or welding defect in the terminal end portion of the weld region, and formation of a non-weld region in the terminal portion of the joint region. Even where some operation to finish the end face of the terminal end portion of the weld region is required, this finishing operation can be economically and easily accomplished with a grinder or file, without having to remove the non-weld region or weld the non-weld region by a supplemental fusion welding operation, which is time-consuming and may possibly cause another welding defect. Further, an assembly of the two planar members joined together by the present method does not suffer from a cavity or recess left in the terminal end portion of the weld region due to removal of the probe from the terminal end portion.

In the method of joining together the two planar members by the friction stir welding operation according to the present invention, the tab plate on which the extreme end of the weld region is to be located after the friction stir welding operation is simply positioned relative to the two planar members to be jointed together, in abutting contact with the end faces of the planar members, prior to the initiation of the friction stir welding operation. Thus, the tab plate can be easily and economically set with respect to the planar members, for preparation of the friction stir welding operation. Further, the tab plate can be easily removed or broken off from an assembly of the joined two planar members, by hand or a wooden hammer. Accordingly, the removal or separation of the tab plate from the assembly can be easily and economically effected after the friction stir welding operation. In addition, the removal of the tab plate does not give rise to a risk of cracking or chipping in the terminal end portion of the weld region formed on the assembly of the two planar members.

The tab plate used in the friction stir welding operation according to the present invention has the cutout having the suitably selected width and depth as described above, and is positioned relative to the planar members prior to the initiation of the friction stir welding operation, such that the terminal end of the terminal end portion of the joint region of the planar members is open to the cutout, and such that the two opposite ends of the width of the cutout have the predetermined positional relationships with the terminal end of the terminal end portion of the joint region. The friction stir welding operation is terminated after the rotary tool which has been moved to the terminal end of the terminal end portion of the joint region is further moved across the cutout to a position within the area of the tab plate. During movement of the rotary tool across the cutout, the stirring actions of the rotary tool to stir the metal material are temporarily interrupted to prevent mixing or interlocking of the metal material of the tab plate stirred by the rotary tool, with the metal material of the assembly of the two planar members joined together. Accordingly, the provision of the cutout in the end face of the tab plate not only prevents occurrence of a joining or welding defect in the terminal end portion of the weld region of the assembly, but also eliminates a risk that a defect such as a cutout is left at the terminal end portion of the weld region after the tab plate is cut off, by a saw or other suitable means, from the assembly of the joined planar members. Further, the positioning of the tab plate relative to the planar members in the manner as described above makes it possible to prevent occurrence of a welding defect such as a tunnel bore due to an escape flow of the plasticised material from the terminal end portion of the joint region into the cutout open in the end face of the tab plate.

As described above, the friction stir welding operation according to the principle of this invention provides an industrially effective method which permits two planar members to be joined together in a simple, efficient and economical fashion, so as to form a sound weld region which is free from any joining or welding defect at its terminal end portion and which can be easily finished at its terminal end portion.

In one preferred form of the method of the invention, the friction stir welding operation is terminated after a trailing end of the rotary tool as viewed in its direction of movement has passed the above-indicated end face of the tab plate.

In another preferred form of the method of the invention, a thickness of the tab plate as held in abutting contact with the end faces of the two planar members is determined such that an upper surface of the tab plate is located between a first position and a second position which are respectively located below and above upper surfaces of the two planar members, by a distance equal to 30% of a thickness of the two planar members. More preferably, a thickness of the tab plate as held in abutting contact with the end faces of the two planar members is determined such that an upper surface of the tab plate is located at the same height as the upper surface of the two planar members, i.e., the thickness of the tab plate is the same as the thickness of the two planar members. In these arrangements, the tab plate can function in an intended manner so as to prevent an escape flow of the plasticised material from the end face of the terminal end portion of the joint region, and the tab plate does not prevent a smooth movement of the rotary tool from the end faces of the planar members corresponding to the terminal end portion of the joint region, to a predetermined position within the area of the upper surface of the tab plate, during a terminal portion of the friction stir welding operation, without an abutting contact of the leading end of the rotary tool with the upper end portion of the end face of the tab plate which projects above the upper surfaces of the planar members, so that the friction stir welding operation can be suitably terminated, so as to assure sound formation of the weld region at its terminal end portion.

The second object indicated above may be achieved according to a second aspect of the present invention, which provides a tab plate used in a method of joining together two planar members by butting together the two planar members so as to form a joint region therebetween, and performing a friction stir welding operation wherein a rotary tool having a shoulder surface at a bottom end thereof and a probe coaxially provided on the shoulder surface is moved relative to the two planar members such that the probe is rotated with the rotary tool and inserted in the joint region, and wherein the tab plate is positioned relative to the two planar members such that an end face of the tab plate is held in abutting contact with end faces of the two planar members which correspond to a terminal portion of the joint region at which the friction stir welding operation is to be terminated, wherein an improvement comprises:

the tab plate having a cutout formed in the end face, the cutout having a width which is not smaller than a radius of a peripheral circle to be described by a peripheral of the shoulder surface of the rotary tool during rotation of the rotary tool, and a depth which is not smaller than a minimum radius of the probe and not larger than the radius of the peripheral circle of the shoulder surface, the width being measured in a direction parallel to the end face and a direction in which the two planar members are butted together, while the depth being measured in a direction perpendicular to the direction of the width.

When the tab plate having the cutout which has the specific width and depth as described above is used in the friction stir welding operation to joint together the two planar members, the end face of the tab plate is held in abutting contact with the end faces of the planar members such that the terminal end portion of the joint region at which the friction stir welding operation is to be terminated is exposed to the cutout, so that the tab plate thus positioned relative to the planar members effectively functions to assure sound formation of a weld region on an assembly of the joined two planar members, even in the terminal end portion of the joint region.

The use of the tab plate according to the second aspect of the present invention permits a friction stir welding operation to be efficiently and effectively performed to join together two planar members, as described above with respect to the first aspect of the invention, for easily and economically manufacturing an assembly of the two planar members, so as to form a weld region having a sound terminal end portion.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE INVENTION

To further clarify the present invention, there will be described in detail a friction stir welding operation according to a preferred embodiment of this invention, by reference to the accompanying drawings.

Figure 1:
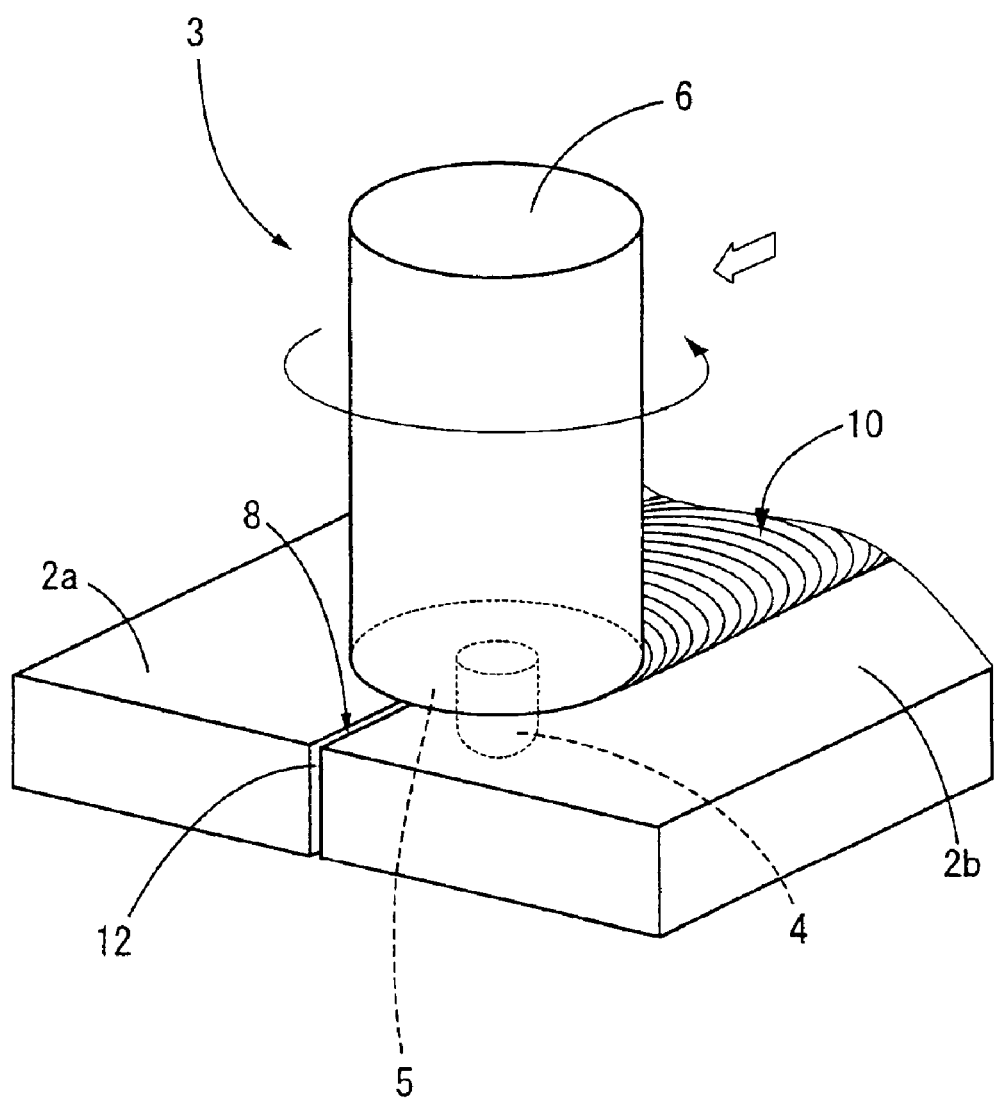
FIG. 1 is a perspective view showing a known method of joining together two planar members by friction stir welding.
Figure 2:
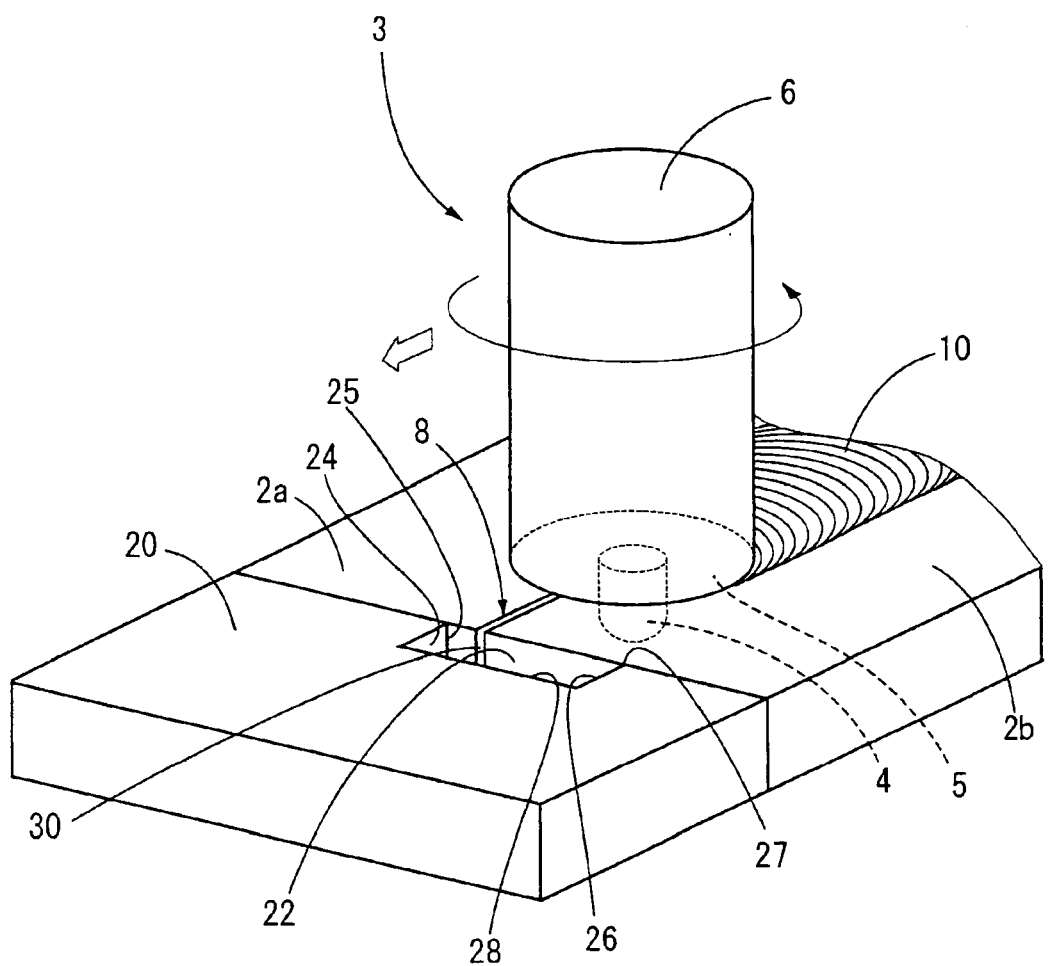
FIG. 2 is a perspective view showing an end portion of a planar structural assembly obtained by a friction stir welding operation according to one embodiment of this invention, after the friction stir welding operation is terminated.

Referring first to FIG. 2, there is shown an end portion of a planar structural assembly obtained by a friction stir welding operation according to one embodiment of this invention, after the friction stir welding operation is terminated. As shown in this figure, the planar structural assembly consists of two planar members 2a, 2b which have been joined together by a friction stir welding operation, along a joint region 8 defined by the mutually butted end portions of the members 2a, 2b. The two planar members 2a, 2b are formed of a desired material such as an aluminum material or an aluminum alloy material, and have a desired same thickness dimension. The friction stir welding operation is performed by using a rotary tool or wheel 3, which has a cylindrical body 6 in the form of a round rod having a circular shoulder surface 5 at its bottom end, and a generally cylindrical probe or pin 4 integrally formed on the shoulder surface 5 such that the probe 4 is coaxial with the shoulder surface 5. As in the friction stir welding operation described above, the rotary tool 3 is rotated at a high speed, by a suitable rotary drive device as known in the art, and is moved relative to the joint region 8, such that the circular shoulder surface 5 is held in rubbing contact with the surface of the joint region 8 while the probe 4 is rotated with the cylindrical body 6 and is inserted in the joint region 8. With the movement of the rotary tool 3, the rotating probe 4 is moved from the initial end of the joint region 8 to the terminal end of the joint region 8 at which the friction stir welding operation is terminated, so that welding takes place along the joint region 8 as the probe 4 is moved relative to the joint region 8.

The rotary tool 3 including the cylindrical body 6 and the generally cylindrical probe 4 is similar in construction and configuration to a rotary tool known in the art. The cylindrical body 6 and the probe 4 are formed of a material which is harder than the material of the two planar members 2a, 2b to be joined together, and which is substantially non-consumable as a result of insertion of the rotating probe 4 in the joint region 8 of the two planar members 2a, 2b, and a rubbing contact of the shoulder surface 5 with the upper surfaces of the planar members 2a, 2b.

Figure 3:
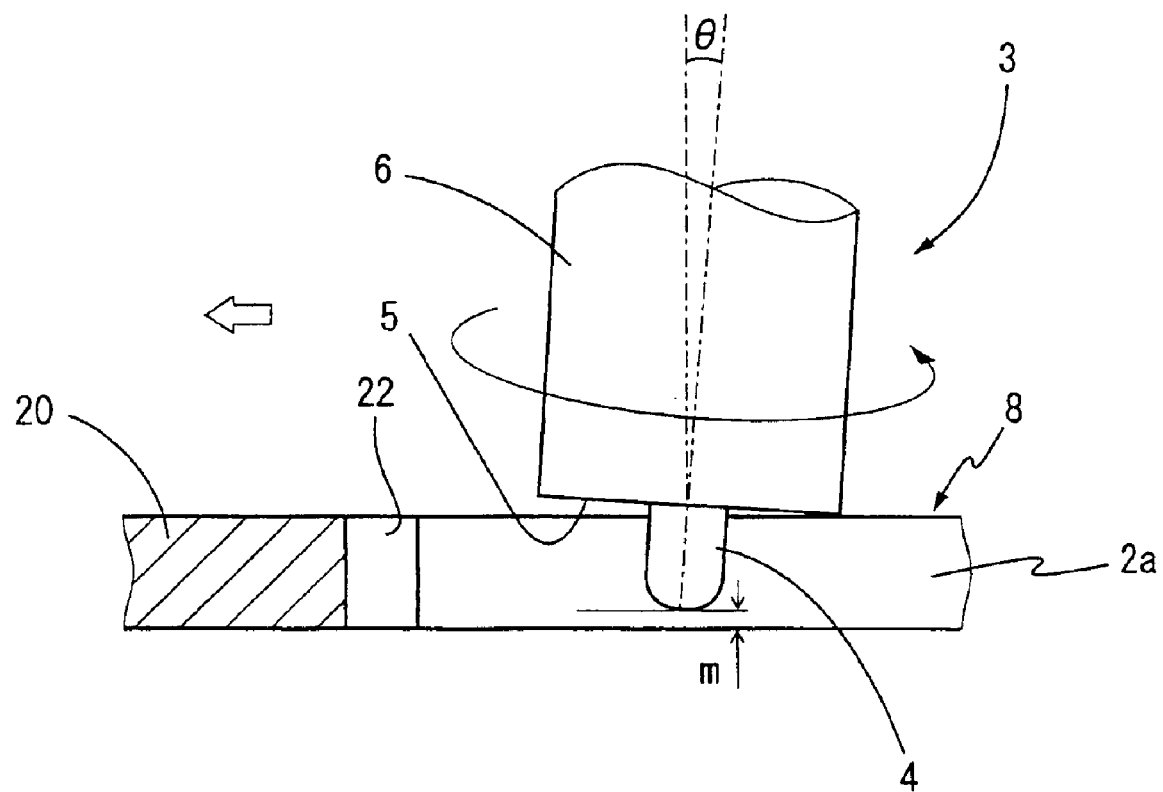
FIG. 3 is an elevational view in axial cross section showing a rotary tool used in the friction stir welding operation, when a probe of the rotary tool is inserted in a joint region defined by the two planar members to be jointed together.

As in the conventional friction stir welding operation, the rotary tool 3 is moved relative to the joint region 8 such that the axis of rotation of the probe 4 is inclined by a predetermined suitable angle θ (e.g., 3°) with respect to the vertical (a line normal to the upper surfaces of the two planar members 2a, 2b), in a direction on the side of the trailing outer edge of the shoulder surface 5, as shown in FIG. 3, namely, in a direction opposite to the direction of movement (indicated by an arrow in FIG. 3) of the rotary tool 3 relative to the joint region 8. Preferably, the probe 4 is inserted in the joint region 8 such that a distance "m" between the tip of the probe 4 and the lower surfaces of the planar members 2a, 2b is not larger than 1 mm, particularly where the thickness of the planar members 2a, 2b is not smaller than 2 mm. If the distance "m" is larger than 1 mm, the stirring action of the rotating probe 4 does not take place over the entire thickness of the planar members 2a, 2b, giving rise to a risk of formation of a defect adjacent to the lower surface of a weld region 10 obtained by the friction stir welding operation along the joint region 8.

As shown in FIG. 2, the friction stir welding operation according to the present embodiment of the invention employs a tab plate 20 which is positioned relative to the two planar members 2a, 2b which have been butted together at their opposite end portions. Described more specifically, the tab plate 20 is held in abutting contact with one end face thereof with the end faces of the two planar members 2a, 2b which correspond to the terminal end portion of the joint region 8 at which the friction stir welding operation is terminated.

With the planar members 2a, 2b and the tab plate 20 being fixed in the positional relationship indicated above, the friction stir welding operation is performed along the joint region 8 to form the weld region 10.

Although the thickness of the tab plate 20 as held in abutting contact with the planar members 2a, 2b as described above is not particularly limited, this thickness is preferably determined such that the upper surface of the tab plate 20 in abutting contact with the end faces of the planar members 2a, 2b is located between a first position and a second position which are respectively located below and above the upper surfaces of the planar member 2a, 2b, by a distance equal to 30% of the thickness of the planar members 2a, 2b.

If the upper surface of the tab plate 20 held in abutting contact with the corresponding end faces of the two planar members 2a, 2b to be joined together is located below the upper surfaces of the planar members 2a, 2b by a distance larger than 30% of the thickness of the planar members 2a, 2b, the tab plate 20 cannot function in an intended manner to prevent an escape flow of the plasticised material from the end face at the terminal end portion of the joint region 8 upon termination of the friction stir welding operation as described below in detail. If the upper surface of the tab plate 20 is located above the upper surfaces of the planar members 2a, 2b by a distance larger than 30% of the thickness of the planar members 2a, 2b, the tab plate 20 will prevent a smooth movement of the rotary tool 3 from the end faces of the planar members 2a, 2b corresponding to the terminal end portion of the joint region 8, to a position within the area of the upper surface of the tab plate 20, during a terminal portion of the friction stir welding operation in which the rotary tool 3 is moved relative to the joint region 8, with the axis of rotation of the probe 4 being inclined at the predetermined angle θ with respect to the vertical, in the direction opposite to the direction of the relative movement. That is, the leading outer edge of the shoulder surface 5 of the cylindrical body 6 of the rotary tool 3 may comes into abutting contact with the upper end portion of the end face of the tab plate 20 which projects above the upper surfaces of the above-indicated end sections of the planar members 2a, 2b. In this case, the tab plate 20 prevents a smooth movement of the rotary tool 3 across the cutout 22, and does not permit adequate termination of the friction stir welding operation so as to assure sound formation of the weld region at its terminal end portion.

Where the two planar members 2a, 2b have more or less different thickness dimensions, the thickness of the tab plate 20 held in abutting contact with the planar member 2a, 2b is preferably determined such that the upper surface of the tab plate 20 is positioned between a first position and a second position which are respectively located below and above the upper surface of the joint region 8, by a distance equal to 30% of the thickness of the joint region 8, in order to prevent an escape flow of the plasticised material from the end face of the terminal end portion of the joint region 8, and to assure a smooth movement of the rotary tool 3 from the terminal end portion of the joint region 8 to a position within the area of the upper surface of the tab plate 20.

Figure 4:
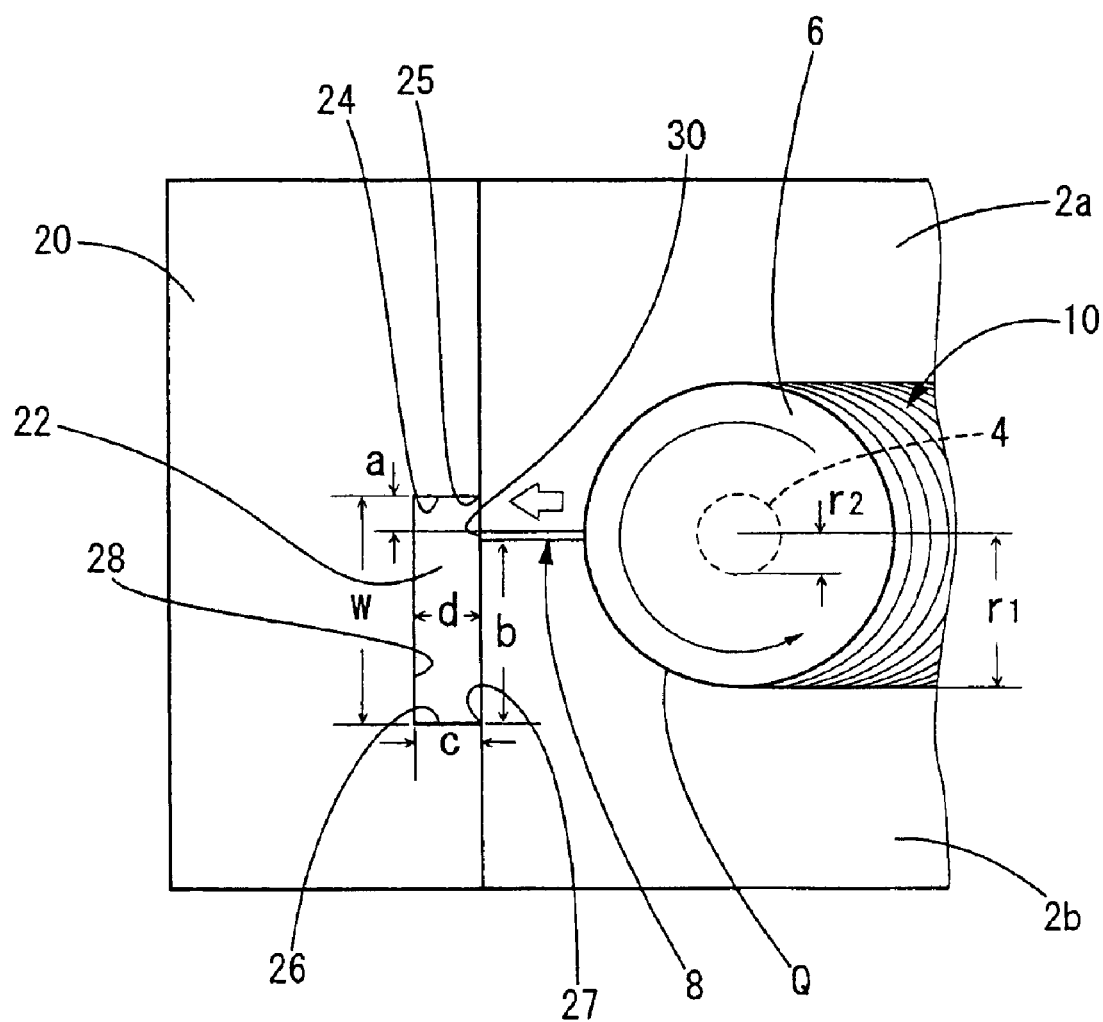
FIG. 4 is a plan view showing a tab plate positioned relative to the end sections of the two planar members, after the friction stir welding operation is terminated at the ends of those end sections.

As shown in FIG. 4, the tab plate 20 has a rectangular cutout or recessed portion 22 formed in its end face for abutting contact with the end faces of the two planar members 2a, 2b, such that the terminal end of the joint region 8 is exposed to the cutout 22 when the tab plate 20 is held in the predetermined positional relationship with the planar members 2a, 2b. The rectangular cutout 22 open in the above-indicated end face of the tab plate 20 is defined by three surfaces, and wherein the three surfaces are defined by; a first side surface 24 to be located on one side of the joint region 8 which corresponds to the planar member 2a; a second side surface 26 to be located on the other side of the joint region 8 which corresponds to the other planar member 2b; and a bottom surface 28 which extends between the first and second side surfaces 24, 26 and which is to be opposed to the terminal end of the joint region 8. That is, the first and second side surfaces 24, 26 of the rectangular cutout 22 extend in parallel to the direction of movement of the rotary tool 3, while the bottom surface 28 extends in a direction perpendicular to the first and second side surfaces 24, 26.

The rectangular cutout 22 has a width "w" which is not smaller than a radius of a peripheral circle Q to be described by the periphery of the circular shoulder surface 5 of the cylindrical body 6 during rotation of the rotary tool 3. The cutout 22 has a depth "d" which is not smaller than a minimum radius of the probe 4 and not larger than the radius of the above-indicated peripheral circle Q of the rotary tool 3.

In the present embodiment, the cylindrical body 6 has a constant diameter over its entire axial length, which is equal to the diameter of the circular shoulder surface 5, and the probe 4 has a constant diameter over its substantially entire axial length. In this arrangement, therefore, the width "w" of the cutout 22 (a distance between the first and second side surfaces 24, 26) is determined so as to be not smaller than a radius $r_1$ of the cylindrical body 6 of the rotary tool 3, while the depth "d" of the cutout 22 (a distance between the bottom surface 28 and the end faces of the planar members 2a, 2b corresponding to the terminal end of the joint region 8 when the tab plate 20 is held in abutting contact with the above-indicated end faces of the planar members 2a, 2b) is determined so as to be not smaller than a radius $r_2$ of the probe 4 and not larger than the radius $r_1$ of the cylindrical body 6. If the cylindrical body 6 is a stepped cylinder consisting of axial portions having respective different diameters, or a frusto-conical body having a varying diameter, or if the shoulder surface 5 of the cylindrical body 6 is a curved surface (e.g., concave surface), the width "w" of the rectangular cutout 22 is determined so as to be not smaller than a radius of the peripheral circle Q to be described by the periphery of the shoulder surface 5, irrespective of whether the diameter of the shoulder surface 5 is smaller or larger than the diameter of the other portions of the cylindrical body 6, or irrespective of the configuration of the shoulder surface 5. Even where the diameter of the probe 4 is not constant over its entire axial length, the depth of the cutout 22 is determined so as to be not smaller than the minimum radius of the probe 4 and not larger than the radius of the above-indicated peripheral circle Q, irrespective of the diameter of the probe 4 at its tip (lower end).

As described above, the tab plate 20 constructed as described above is positioned relative to the two planar members 2a, 2b, prior to the initiation of the friction stir welding operation, such that the tab plate 20 is held in abutting contact, at its end face having the rectangular cutout 22, with the end faces of the planar members 2a, 2b corresponding to the terminal end of the joint region 8 at which the friction stir welding operation is to be terminated. Thus, the tab plate 20 is positioned such that the rectangular cutout 22 has a predetermined positional relationship with the joint region 8 defined by the end portions of the two planar members 2a, 2b which have been butted together.

That is, the tab plate 20 is positioned relative to the joint region 8 of the two planar members 2a, 2b such that the terminal end of the joint region 8 is exposed to the cutout 22, at a position between an outer end 25 of the first side surface 24 and an outer end 27 of the second side surface 26 such that the outer ends 25 and 27 are spaced from the terminal end of the joint region 8 by respective distances, as described below. The outer ends 25, 27 define the width "w" of the cutout 22.

Described in greater detail, the rotary tool 3 is rotated in the counterclockwise direction as seen in the plan view of FIG. 4, while the rotary tool 3 is moved relative to the two planar members 2a, 2b in the direction of movement of the rotary tool 3 (indicated by an arrow in FIG. 4). The first side surface 24 (its outer end 25) is located on one side of the joint region 8 which corresponds to the upstream side as seen in the rotating direction of the rotary tool 3, as viewed at the leading end of the rotary tool 3 in its direction of movement, namely, is located on the right side of the joint region 8 as seen in the direction of movement of the rotary tool 3, or on the upper side of the joint region 8 as seen in the plan view of FIG. 4. On the other hand, the second side surface 26 (its outer end 27) is located on the other side of the joint region 8, namely, on the left side of the joint region 8 as seen in the direction of movement of the rotary tool 3, or on the lower side of the joint region 8 as seen in the plan view of FIG. 4. The outer end 25 is spaced apart from the joint region 8 by a predetermined distance not larger than the radius $r_2$ of the probe 4 in the direction of the width "w" of the cutout 22. However, this spacing distance between the outer end 25 and the joint region 8 may be zero. The outer end 27 is spaced apart from the joint region 8 by a predetermined distance not smaller than the radius $r_1$ of the cylindrical body 6 (radius of the circular shoulder surface 5).

In other words, the end face of the tab plate 20 in which the rectangular cutout 22 is formed is positioned in abutting contact with the end faces of the planar members 2a, 2b corresponding to the terminal end portion of the joint region 8, such that a distance "a" between the outer end 25 of the first side surface 24 and a terminal end 30 of the joint region 8 is selected so as to be not smaller than 0 and not larger than radius $r_2$ of the probe 4, while a distance "b" between the outer end 27 of the second side surface 26 and the terminal end 30 is selected so as to be not smaller than the radius $r_1$ of the cylindrical body 6. Since the depth "d" of the cutout 22 is not smaller than the radius $r_2$ of the probe 4 and not larger than the radius $r_1$ of the cylindrical body 6 (shoulder surface 5), as described above, a distance "c" between the bottom surface 28 of the cutout 22 and the end face of the planar member 2b which corresponds to the terminal end portion of the joint region 8 is not smaller than the radius $r_2$ of the probe 4 and not larger than the radius $r_1$ of the cylindrical body 6 when the tab plate 20 is positioned relative to the two planar members 2a, 2b such that the end face having the cutout 22 is held in abutting contact with the end faces of the planar members 2a, 2b which correspond to the terminal end portion of the joint region 8. Namely, the distance "c" is equivalent to the depth "d" of the cutout 22.

In the present embodiment wherein the cylindrical body 6 has a constant diameter over its entire axial length and the probe 4 has a constant diameter over its substantially entire axial length, as described above, the above-indicated dimensions "a", "b" and "c" are defined by the radius $r_1$ of the cylindrical body 6 and the radius $r_2$ of the probe 4. In general, however, the cutout 22 is positioned relative to the joint region 8 such that the distance "a" between the outer end 25 of the first side surface 24 and the terminal end 30 of the joint region 8 is not smaller than zero and not larger than the maximum radius of the probe 4, while the distance "b" between the outer end 27 of the second side surface 26 and the terminal end 30 is not smaller than the radius of the peripheral circle Q to be described by the periphery of the shoulder surface 5 during rotation of the rotary tool 3. Further, the distance "c" between the bottom surface 28 of the cutout 22 and the end face of the planar member 2b which corresponds to the terminal end portion of the joint region 8 is not smaller than the minimum radius of the probe 4 and not larger than the radius of the peripheral circle Q.

Figure 5:
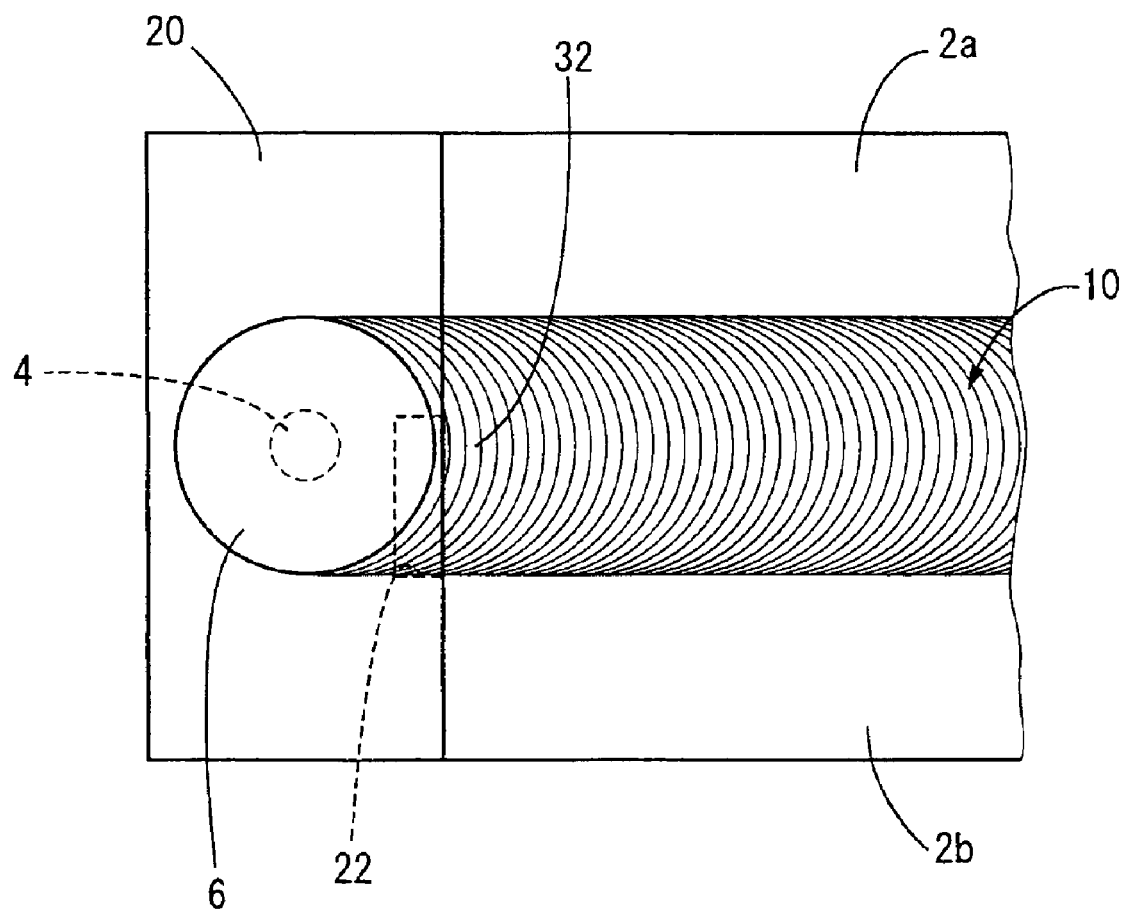
FIG. 5 is a fragmentary plan view for explaining a position at which the rotary tool is lifted up after the friction stir welding operation is terminated at the end sections of the planar members shown in FIG. 4.

The friction stir welding operation is performed on the two planar members 2a, 2b butted together so as to form the joint region 8, while the tab plate 20 is positioned relative to the planar members 2a, 2b such that the end face having the cutout 22 is held in abutting contact with the end faces of the planar members 2a, 2b, as described above. The rotary tool 3 is moved from the initial end to the terminal end 30 of the joint region 8, and is further moved across the cutout 22 to a suitable position within the area of the upper surface of the tab plate 20, as shown in FIG. 5. Described more specifically, the rotary tool is moved until the trailing end of the rotary tool 3 (trailing outer edge of the shoulder surface 5) has passed the end face of the tab plate 20 in abutting contact with the end faces of the planar members 2a, 2b. The rotary tool 3 is then lifted up away from the tab plate 20, so that the friction stir welding operation is terminated. Thus, the sound weld region 10 is formed along the joint region 8 of the two planar members 2a, 2b.

If the distance "a" between the outer end 25 of the first side surface 24 of the cutout 22 of the tab plate 20 and the terminal end 30 of the joint region 8 is smaller than zero, that is, if the outer end 25 is located on one side of the terminal end 30 of the joint region 8 which is nearer to the outer end 27 of the second side surface 26, the metal material in a local portion of the tab plate 20 which is near the outer end 25 (near the first side surface 24) located on the above-indicated side of the terminal end 30, and the metal material in local portions of the planar members 2a, 2b which are near the terminal end 30 are subject to stirring actions of the probe 4 and the shoulder surface 5 of the rotary tool 3, so that those metal materials are mixed together, giving rise to a risk of occurrence of a joining or welding defect such as cracking in a terminal end portion 32 of the weld region 10 which is formed along the joint region 8 as a result of the friction stir welding operation.

If the distance "a" between the outer end 25 and the terminal end 30 is larger than the radius $r_2$ of the probe 4 (larger than the maximum radius of the probe 4), the probe 4 is completely spaced apart from the first side surface 24 of the cutout 22 when the probe 4 which has been moved along the joint region 8 is further moved into the cutout 22, so that the first side surface 24 cannot function to prevent an escape flow of the plasticised metal material from the terminal end 30 of the joint region 8 into the cutout 22, so that the terminal end portion 32 of the weld region 10 formed along the joint region 8 may suffer from formation of a tunnel bore due to the escape flow of the plasticised metal out of the terminal end portion of the joint region 8.

If the distance "b" between the outer end 27 of the second side surface 26 of the cutout 22 and the terminal end 30 of the joint region 8 is smaller than the radius $r_1$ of the cylindrical body 6 of the rotary tool 3 (smaller than the peripheral circle Q of the shoulder surface 5), the metal material in a local portion of the tab plate 20 which is near the outer end 27 (near the second side surface 26) and the metal material in a local portion of the planar member 2b which is near the second side surface 26 are subject to the stirring action of the shoulder surface 5, so that those metal materials are mixed together, giving rise to a risk of occur-rence of a joining or welding defect such as cracking in the terminal end portion 32 of the weld region 10 formed along the joint region 8.

If the distance "c" between the bottom surface 28 of the cutout 22 and the end face of the planar member 2b corresponding to the terminal end portion of the joint region 8 is smaller than the radius $r_2$ (minimum radius) of the probe 4, the metal material in a local portion of the tab plate 20 which is near the bottom surface 28, and the metal material in a local portion of the planar member 2b which is near the above-indicated end face are subject to the stirring actions of the rotary tool 3, so that those metal materials are mixed together, giving rise to a risk of occurrence of a joining or welding defect in the terminal end portion 32 of the weld region 10 formed along the joint region 8, as in the case where the distance "a" is smaller than the radius $r_2$ of the probe 4, or where the distance "b" is smaller than the radius $r_1$ of the cylindrical body 6.

If the distance "c" is larger than the radius $r_1$ of the cylindrical body 6 (larger than the radius of the peripheral circle Q of the shoulder surface 5), the probe 4 is completely spaced apart from the bottom surface 28 of the cutout 22 when the probe 4 is moved into the cutout 22, so that the bottom surface 28 cannot function to prevent an escape flow of the plasticised metal material from the terminal end 30 of the joint region 8 into the cutout 22, so that the terminal end portion 32 of the weld region 10 formed along the joint region 8 may suffer from formation of a tunnel bore due to the escape flow of the plasticised metal out of the terminal end portion of the joint region 8, as in the case where the distance "a" is larger than the radius $r_2$ of the probe 4.

According to the friction stir welding process performed along the joint region 8 of the planar members 2a, 2b in the present embodiment, the tab plate 20 is positioned relative to the planar members 2a, 2b such that the end fact having the cutout 22 is held in abutting contact with the end faces of the planar members 2a, 2b, so as to satisfy the requirements of the distances "a", "b" and "c" described above, so that the terminal end portion 32 of the weld region 10 is free from any joining or welding defect or formation of a tunnel bore. Thus, the friction stir welding process according to the present embodiment permits sound formation of the weld region 10, even in the terminal end portion 32 corresponding to the terminal end portion of the joint region 8 at which the friction stir welding operation is terminated.

The present friction stir welding process is further advantageous in that the rotary tool 3 is lifted up, that is, the friction stir welding operation is terminated after the rotary tool 3 has been moved through the cutout 22 to a position within the area of the upper surface of the tab plate 20, so that the extreme end of the terminal end portion 32 of the weld region 10 is located within the area of the tab plate 20. Accordingly, the present friction stir welding process is effective to prevent a non-weld region from remaining in the terminal end portion of the joint region 8, and prevent formation of a cavity or recess in the terminal end portion of the joint region 8 due to removal of the probe 4 from the planar members 2a, 2b.

Further, the tab plate 20 which assures sound formation of the weld region 10 can be easily positioned relative to the planar members 2a, 2b, in abutting contact with their end faces, prior to the initiation of the friction stir welding operation. In addition, the tab plate 20 will not be joined to the planar members 2a, 2b after the termination of the friction stir welding operation, so that the tab plate 20 can be easily separated from the planar members 2a, 2b after the friction stir welding operation. Thus, the friction stir welding operation which permits the sound formation of the weld region 10 without a joining or welding defect at the terminal end 30 of the joint region 8 can be performed in a simple, efficient and economical fashion, and an operation to rectify or finish the terminal end 30 after the separation of the tab plate 20 from the planar members 2a, 2b can be easily performed.

As described above, the friction stir welding process according to the present embodiment of the invention permits an economical and efficient operation to join the two planar members 2a, 2b together, while assuring the formation of the weld region 10 having the sound terminal end portion 32.

The present friction stir welding process which permits sound formation of the terminal end portion 32 of the weld region 10 is particularly suitably applicable to the manufacture of relatively large-sized structural assemblies, by joining together aluminum alloy plates or sheets, or extruded, rolled or cast members of aluminum alloy. The structural assemblies formed by the present friction stir welding process are suitably used as structural members of railroad cars, and outer panels, sub-frames and wheels of automobiles.

In the tab plate 20 used in the present embodiment, the first and second side surfaces 24, 26 of the cutout 22 are opposed to each other in the direction perpendicular to the direction of movement of the rotary tool 3, and extend in the direction of movement of the rotary tool 3, while the bottom surface 28 of the cutout 22 is perpendicular to the first and second side surfaces 24, 26, and cooperates with the first and second side surfaces 24, 26 to define the rectangular shape in cross section taken in a plane parallel to the upper surface of the tab plate 20. However, the friction stir welding operation may be performed by using a tab plate having a cutout of any desired configuration other than the rectangular shape. For instance, the cutout may be defined by two side surfaces and a bottom surface, at least one of which is curved, or inclined with respect to the other by a desired angle other than 90°. Alternatively, the surfaces defining the cutout may include surfaces which cooperate to define at least one bend or recess. Further, the corners formed by the adjacent first and second side surfaces 24, 26 and the bottom surface 28 may formed so as to have an acute or obtuse angle, or a fillet.

The cutout formed in the tab plate 20 does not necessarily be defined by the three surfaces consisting of the first and second side surfaces 24, 26 and the bottom surface 28. For example, the cutout may be defined by a single continuous surface, two surfaces or four or more surfaces, having a polygonal shape (other than a rectangular shape), a U shape or an arcuate shape in cross section taken in a plane parallel to the upper surface of the tab plate 20.

Where the cutout has a cross sectional shape other than the rectangular shape, too, the two outer ends corresponding to the outer ends 25, 27 of the first and second side surfaces 24, 26 in the illustrated embodiment are required to be positioned with respect to the terminal end 30 of the joint region 8, as described above, when the tab plate is held in abutting contact with the two planar members 2a, 2b. As long as those two outer ends are positioned relative to the planar members 2a, 2b as described above, the entirety of the surface which partially defines the cutout and which extends from each of the outer ends need not be positioned as described above.

While the two planar members 2a, 2b have the same thickness dimension in the illustrated embodiment, they may have respective different thickness dimensions. In other words, the friction stir welding process according to the present invention is equally applicable to an operation to join together the two planar members having respective different thickness dimensions.

EXAMPLES

To illustrate the present invention, there will be described some examples of the invention. It is to be understood that this invention is not limited to the details of the examples, but may be embodied with various changes, modifications and improvements, which may occur to those skilled in the art, without departing from the spirit and scope of the invention defined in the appended claims.

Initially, seven pairs of planar members in the form of plates of an aluminum alloy (5454-O) each having a thickness of 3 mm, a width of 300 mm and a length of 5000 mm were prepared as workpieces to be joined together, and seven tab plates A–G each having a thickness of 3 mm, a width of 30 mm and a length of 40 mm were prepared. The four tab plates A–D were formed of the same aluminum alloy material (5454-O) as those of the planar members, while the three tab plates E–G were formed of an aluminum alloy material (5083-O) harder than those of the planar members. Each of the tab plates A–G has a rectangular cutout having the width "w" and the depth "d" as indicated in TABLE 1 given below.

TABLE 1

|  | Width w (mm) | Depth d (mm) |
| --- | --- | --- |
| Tab plate A | 14 | 3 |
| Tab plate B | 20 | 7.5 |
| Tab plate C | 14 | 1 |
| Tab plate D | 14 | 9 |
| Tab plate E | 7.5 | 5 |
| Tab plate F | 13 | 2 |
| Tab plate G | 7 | 5 |

The two planar members of the first pair were butted together so as to define a joint region extending in the direction of their length, and fixedly positioned on a table. The tab plate A was positioned relative to the two planar members, as shown in FIG. 4, such that the end face having the cutout was held in abutting contact with the end faces of the planar members which correspond to the terminal end portion of the joint region, and such that the cutout had the distances "a", "b" and "c" as indicated in TABLE 2 given below. The tab plate A was also fixed on the table.

Then, a friction stir welding operation was performed along the joint region of the two planar members fixed on the table, by using a rotary tool having a shoulder surface with a diameter of 17 mm, and a probe having a length of 2.8 mm and a diameter of 4 mm. The rotary tool was rotated at 1500 r.p.m., and was moved at a speed of 250 mm/min. The friction stir welding operation was terminated by lifting the rotary tool away from the tab plate A when the rotary tool was moved to a position at which the trailing outer edge of the shoulder surface of the rotary tool was spaced apart by 25 mm from the interface between the tab plate A and the planar members, in the direction of movement of the rotary tool. As a result, an assembly of the two planar members and the tab plate A adhering to the end faces of the planar members was obtained as Example 1.

Similarly, the two planar members of each of the other six pairs were butted together and fixedly positioned on the table, and the corresponding one of the tab plates B–G was positioned relative to the two planar members, as shown in FIG. 4, such that the end face having the cutout was held in abutting contact with the end faces of the planar members and such that the cutout had the distances "a", "b" and "c" (indicated in FIG. 4) as indicated in TABLE 2. The tab plates B–G were also fixed on the table.

The friction stir welding operations were performed on those six pairs of planar members, with the same rotary tool being operated under the same condition, as in the friction stir welding operation to obtain Example 1. As a result, six assemblies each consisting of the two planar members and the corresponding one of the tab plates B–G were obtained as Examples 2,3 and Comparative Examples 1–4.

Each of the tab plates A–G adhering to the corresponding pair of two planar members of Examples 1–3 and Comparative Examples 1–4 was removed by a wooden hammer, and a testpiece in the form of an elongate strip having a width of 20 mm and a length of 200 mm was prepared by cutting the pair of two planar members of each of Examples 1–3 and Comparative Examples 1–4 such that the terminal end portion (32) of the weld region (10) was located in the middle of the length of the strip. The thus prepared testpieces were subjected to a longitudinal bending test according to Roller Bending Test Method (JIS Z3122), to check the testpieces for any joining or welding defect such as a tunnel pore or cracking. The testpieces were evaluated of their weld quality, on the basis of a result of the bending test. The result of the bending test and a result of the weld quality evaluation are indicated in TABLE 2, wherein "OK" and "NG" means that the weld quality is acceptable and unacceptable, respectively.

TABLE 2

| | Tab Plate | a (mm) | b (mm) | c (mm) | Bending Test Result | Evaluation |
|---|---|---|---|---|---|---|
| Example 1 | A | 1 | 13 | 3 | No defects | OK |
| Example 2 | B | 2 | 18 | 7.5 | No defects | OK |
| Example 3 | E | 0 | 7.5 | 5 | No defects | OK |
| Comparative Example 1 | C | 1 | 13 | 1 | Tunnel pore near back bead | NG |
| Comparative Example 2 | D | 1 | 13 | 9 | Crack near back bead | NG |
| Comparative Example 3 | F | 3 | 10 | 2 | Tunnel pore near back bead | NG |
| Comparative Example 4 | G | 1 | 6 | 5 | Tunnel pore at center of weld thickness | NG |

It will be understood from TABLE 2 that Examples 1–3 obtained by the friction stir welding operations using the tab plates A, B and E positioned relative to the planar members, so as to satisfy the requirements of the distances "a", "b" and "c" (indicated in FIG. 4) according to the present invention had sound weld regions without a tunnel pore, cracking or any other joining or welding defect. It will also be understood, however, that Comparative Examples 1–4 obtained by the friction stir welding operations using the tab plates C, D, F and G positioned relative to the planar members such that at least one of the distances "a", "b" and "c" does not satisfy the requirements according to the present invention suffered from a joining or welding defect such as a tunnel pore or cracking in the weld regions. Thus, the test clearly showed that the friction stir welding process according to the present invention permits sound formation of the weld region along the joint region defined by the two planar members butted together.

As described above, the friction stir welding process according to the principle of this invention provides an industrially effective method which permits two planar members to be joined together in a simple, efficient and economical fashion, so as to form a sound weld region which is free from any joining or welding defect at its terminal end portion and which can be easily finished at its terminal end portion.

In particular, the use of the tab plate according to the present invention permits a friction stir welding operation to be efficiently and effectively performed to join together the two planar members, for easily and economically manufacturing an assembly of the two planar members, so as to form a weld region having a sound terminal end portion.

What is claimed is:

1. A method of joining together two planar members, by butting together the two planar members so as to form a joint region therebetween, and performing a friction stir welding operation wherein a rotary tool having a shoulder surface at a bottom end thereof and a probe coaxially provided on the shoulder surface is moved relative to said two planar members such that said probe is rotated with said rotary tool and inserted in said joint region, said method comprising the steps of:

preparing a tab plate having a cutout formed in an end face thereof, such that said cutout has a width which is not smaller than a radius of a peripheral circle to be described by a periphery of said shoulder surface of said rotary tool during rotation of the rotary tool, and a depth which is not smaller than a minimum radius of said probe and not larger than the radius of said peripheral circle of said shoulder surface, said width being measured in a direction parallel to said end face and a direction in which said two planar members are butted together, while said depth being measured in a direction perpendicular to the direction of said width;

positioning said tab plate relative to said two planar members such that said end face is held in abutting contact with end faces of said two planar members which correspond to a terminal portion of said joint region at which said friction stir welding operation is to be terminated, and such that one of opposite ends of said width is located on one side of said joint region which corresponds to an upstream side as seen in a rotating direction of said rotary tool, as viewed at a leading end of said rotary tool in its direction of movement, and further such that a distance between a terminal end of said terminal end portion of said joint region and said one end of said width is not smaller than zero and not larger than a maximum radius of said probe, while a distance between said terminal end and the other of said opposite ends of said width is not smaller than the radius of said peripheral circle; and initiating said friction stir welding operation after said tab plate is positioned relative to said two planar members, and terminating said friction stir welding operation after said rotary tool which has been moved to said terminal end of said joint region is further moved across said cutout to a position within an area of said tab plate.

2. The method according to claim 1, wherein said friction stir welding operation is terminated after a trailing end of said rotary tool as viewed in its direction of movement has passed said end face of said tab plate.

3. The method according to claim 1, wherein a thickness of said tab plate as held in abutting contact with said end faces of said two planar members is determined such that an upper surface of said tab plate is located between a first position and a second position which are respectively located below and above upper surfaces of said two planar members, by a distance equal to 30% of a thickness of said two planar members.

4. The method according to claim 1, wherein a thickness of said tab plate as held abutting contact with said end faces of said two planar members is the same as the thickness of said two planar members.

5. The method according to claim 1, wherein said rotary tool includes a cylindrical body having a constant diameter over an entire axial length thereof and a circular shoulder surface at a bottom end thereof, and said probe in the form of a pin which is coaxially formed on said circular shoulder surface and having a constant diameter over a substantially entire axial length thereof, said width being not smaller than a radius of said cylindrical body, while said depth being not smaller than a radius of said pin and not larger than the radius of said cylindrical body, and wherein said distance between said terminal end of said terminal end portion of said joint region and said one end of said width is not larger than the radius of said pin, while said distance between said terminal end and said other end of said width is not smaller than the radius of said cylindrical body.

6. The method according to claim 1, wherein said tab plate is removed from the joined two planner members after terminating said friction stir welding operation, by one of hand and a wooden hammer.

7. The method according to claim 1, wherein said cutout has a rectangular shape in cross section taken in a plane parallel to the upper surface of the tab plate.

8. The method according to claim 1, wherein said planar members are formed of a material selected from the group consisting of aluminum materials and aluminum alloy materials.

9. The method according to claim 1, wherein said two planar members have the same thickness dimension.

10. The method according to claim 1, wherein said two planar members have respective different thickness dimensions.

11. A tab plate used in a method of joining together two planar members by butting together the two planar members so as to form a joint region therebetween, and performing a friction stir welding operation wherein a rotary tool having a shoulder surface at a bottom end thereof and a probe coaxially provided on the shoulder surface is moved relative to said two planar members such that said probe is rotated wit said rotary tool and inserted in said joint region, and wherein said tab plate is positioned relative to said two planar members such that an end face of said tab plate is held in abutting contact with end faces of said two planar members which correspond to a terminal portion of said joint region at which said friction stir welding operation is to be terminated, wherein an improvement comprises:

said tab plate having a cutout formed in said end face, said cutout having a width which is not smaller than a radius of a peripheral circle to be described by a peripheral of said shoulder surface of said rotary tool during rotation of the rotary tool, and a depth which is not smaller than a minimum radius of said probe and not larger than the radius of said peripheral circle of said shoulder surface, said width being measured in a direction parallel to said end face and a direction in which said two planar members are butted together, while said depth being measured in a direction perpendicular to the direction of said width.

12. The tab plate according to claim 11, wherein said rotary tool includes a cylindrical body having a constant diameter over an entire axial length thereof and a circular shoulder surface at a bottom end thereof, and said probe in the form of a pin which is coaxially formed on said circular shoulder surface and having a constant diameter over a substantially entire axial length thereof, said width being not smaller than a radius of said cylindrical body, while said depth being not smaller than a radius of said pin and not larger than the radius of said cylindrical body.

13. The tab plate according to claim 11, wherein said tab plate is made of a material which is the same as the material of the two planar members.

14. The tab plate according to claim 11, wherein said tab plate is made of a material which is different from the material of the two planar members.

15. The tab plate according to claim 11, wherein said cutout has a rectangular shape in cross section taken in a plane parallel to the upper surface of the tab plate.

16. The tab plate according to claim 11, wherein said cutout is defined by three surfaces, and wherein said three surfaces includes a first side surface to be located on one side of the joint region which corresponds to one of said two planar members, a second side surface to be located on the other side of the joint region which corresponds to the other planar member, and a bottom surface which extends between the first and second side surfaces and which is to be opposed to the terminal end of the joint region.

* * * * *